United States Patent [19]

Itamura et al.

[11] Patent Number: 5,094,921
[45] Date of Patent: Mar. 10, 1992

[54] MULTILAYERED STRUCTURE

[75] Inventors: Sumio Itamura; Tohei Moritani; Toshiaki Sato; Taichi Negi, all of Kurashiki, Japan

[73] Assignee: Kuraray Co., Ltd., Kurashiki, Japan

[21] Appl. No.: 563,843

[22] Filed: Aug. 8, 1990

Related U.S. Application Data

[63] Continuation-in-part of Ser. No. 527,117, May 22, 1990, abandoned.

Foreign Application Priority Data

[30]
May 30, 1989 [JP] Japan .................. 1-137754
Sep. 18, 1989 [JP] Japan .................. 1-242942

[51] Int. Cl.$^5$ .............................................. B32B 27/30
[52] U.S. Cl. .................................. 428/520; 428/476.3; 428/483; 428/517; 428/518; 428/521; 428/522; 525/57; 525/58
[58] Field of Search ............... 428/517, 518, 520, 521, 428/522, 483, 476.3; 525/57, 58

[56] References Cited

U.S. PATENT DOCUMENTS

| | | | |
|---|---|---|---|
| 4,309,465 | 6/1982 | Kornbaum | 428/35 |
| 4,590,131 | 5/1986 | Yazaki et al. | 428/516 |
| 4,673,711 | 6/1987 | Sharps, Jr. et al. | 525/240 |

FOREIGN PATENT DOCUMENTS

| | | |
|---|---|---|
| 0086058 | 8/1983 | European Pat. Off. . |
| 51-095478 | 8/1976 | Japan . |
| 53-039380 | 4/1978 | Japan . |
| 59-101338 | 6/1984 | Japan . |
| 60-163952 | 8/1985 | Japan . |

*Primary Examiner*—Merrell C. Cashion, Jr.
*Assistant Examiner*—D. S. Nakarani
*Attorney, Agent, or Firm*—Kramer, Brufsky & Cifelli

[57] ABSTRACT

Provided are multilayered structures comprising at least 2 layers of a layer which comprises a resin composition comprising:

(A) a thermoplastic resin,
(B) a saponified product of an ethylene-vinyl acetate copolymer having an ethylene content of 20 to 65 mol % and a saponification degree of vinyl acetate component of at least 96%, and
(C) a saponified product of an ethylene-vinyl acetate copolymer having an ethylene content of 68 to 98 mol % and a saponification degree of vinyl acetate component of at least 20%, and a layer which comprises a saponified product of an ethylene-vinyl acetate copolymer having an ethylene content of 20 to 65 mol % and a saponification degree of vinyl acetate component of at least 96%.

These multilayered structures have excellent gas barrier properties and resistance to intralayer delamination, and the resin composition layer thereof has neat appearance.

9 Claims, No Drawings

MULTILAYERED STRUCTURE

This application is a continuation-in-part of application Ser. No. 527,117, filed May 22, 1990 now is abandoned.

BACKGROUND OF THE INVENTION

1. Field of the Invention

The present invention relates to multilayered structures having neat appearance and excellent gas barrier properties.

2. Description of the Prior Art

Multilayered plastic packaging materials comprising a layer of a thermoplastic resin, particularly a polyolefin, having excellent mechanical properties and resistance to moisture, and, via an adhesive resin, a layer of a saponified product of an ethylene-vinyl acetate copolymer (hereinafter referred to as EVOH) are widely used, as oxygen-barrier containers, for packaging foods, cosmetics, pharmaceuticals, chemicals, toilettery and the like.

When these multilayered plastic containers are produced, what is known as "regrind" necessarily generates, such as fins caused by pinch-off in blow molding of bottles and punched wastes in molding cups, and their reuse is required from the viewpoint of economy and resource-saving. To effectively reuse the regrind, Japanese Patent Publication No. 29409/1984 discloses a process which comprises mixing the regrind into a thermoplastic resin layer such as polyolefin, which is principal raw material, and Japanese Patent Application Laid-open No. 101338/1984 discloses a process which comprises interposing the regrind between a thermoplastic resin layer and an EVOH layer. However, when most of thermoplastic resins, particularly polyolefin is melt extrusion molded simultaneously with scrap resins containing EVOH, the EVOH tends to deteriorate to cause black deposits ("charred resin on screw") to generate inside the extruder, or gelled matters ("lip stain") to adhere to dielip and other parts, and further nonuniform phase-separated irregular matters or abnormal flow to generate. These troubles then impair the properties of molded articles, such as deterioration of appearance, that of odor-keeping properties due to smell of decomposed resins and decrease in mechanical properties including resistance to shock. Accordingly, this type of extrusion molding cannot be practiced at all, or, is, if ever, practiced in most cases only for a short period of time.

Furthermore, when EVOH is co-extrusion molded together with a blend of polyolefin and EVOH, the molded articles tend to have turbulence (wavy pattern) on their surface and suffer delamination.

SUMMARY OF THE INVENTION

An object of the present invention is to provide a multilayered structure having neat appearance without turbulence (wavy pattern) and high gas barrier property, comprising an EVOH layer and a layer of a blend comprising EVOH and polyolefin, which is free from generation of lip stain or flow instability upon molding and can effectively reuse scraps such as regrind.

The present inventors have fond that multilayered molding with EVOH and a blend comprising a thermoplastic resin, particularly polyolefin (A), EVOH (B) and, further, an appropriate amount of a specific saponified product of an ethylene-vinyl acetate copolymer (C) (hereinafter referred to as S-EVOH) having an ethylene content of 68 to 98 mol % and a saponification degree of vinyl acetate component of at least 20% will not produce charred resin on screw or lip stain, or flow instability, and will provide multilayered structures having excellent gas barrier property and neat appearance without turbulence (wavy pattern).

DETAILED DESCRIPTION OF PREFERRED EMBODIMENTS

Examples of the polyolefin (A), mentioned as representative thermoplastic resin (A) in the present invention include, among others, high, medium and low density polyethylenes; polyethylenes, copolymerized with an α-olefin such as vinyl acetate, acrylic acid ester, butene, hexene or 4-methyl-1-pentene; ionomer resins, polypropylene homopolymer, polypropylene graft-polymerized with ethylene, polypropylenes copolymerized with an α-olefin such as ethylene, butene, hexene or 4-methyl-1-pentene; modified polypropylenes blended with rubber-related polymers; poly-1-butene; poly-4-methyl-1-pentene; modified polyolefins obtained by reacting the foregoing polyolefins with maleic anhydride; and the like. Among these polyolefins, particularly important in the present invention are polypropylene-based resins, with polyethylene-based resins coming next.

Examples of the thermoplastic resin (A) other than the above-mentioned polyolefins are polyamide resins, polyester resins, polystyrene resins, polyvinyl chloride resins, acrylic resins, polyvinylidene chloride resin, polyurethane resins, polyvinyl acetate resin, polyacetal resins, polycarbonate resins and the like. Among these resins, particularly important in the present invention are polyamide, polyester, polyvinyl chloride and polystyrene resins.

Examples of the polyamide resins are polycapramide (Nylon-6), poly-Ω, aminoheptanoic acid (Nylon-7), poly-Ω-aminononaic acid (Nylon-9), polyundecanamide (Nylon-11), polylauryllactam (Nylon-12), polyethylenediamineadipamide (Nylon-2,6), polytetramethyleneadipamide (Nylon-4,6), polyhexamethyleneadipamide (Nylon-6,6), polyhexamethylenesebacamide (Nylon-6,10), polyhexamethylenedodecamide (Nylon-6,12), polyoctamethyleneadipamide (Nylon-8,6), polydecamethyleneadipamide (Nylon-10,6), polydodecamethylenesebacamide (Nylon-10,8), caprolactam/lauryllactam copolymer, caprolactam/hexamethylenediammonium adipate copolymer, lauryllactam/hexamethylenediammonium adipate copolymer, hexamethylenediammonium adipate/hexamethylenediammonium sebacate copolymer, ethylenediammonium adipate/hexamethylenediammonium adipate copolymer, caprolactam/hexamethylenediammonium adipate/hexamethylenediammonium sebacate copolymer, and the like.

Examples of the polyester resins are poly(ethylene terephthalate), poly(butylene terephthalate), poly(ethylene terephthalate/isophthalate), poly(ethylene glycol/cyclohexanedimethanol/terephthalate) and the like. Further these polymers may comprise copolymerizable components of diols, such as ethylene glycol, butylene, cyclohexanedimethanol, neopentyl glycol and pentanediol, and dicarboxylic acids, such as isophthalic acid, benzophenonedicaroxylic acid, dephenylsulfonedicarboxylic acid, diphenylmethanedicarboxylic acid, propylenebis(phenylcarboxylic acid), diphenyloxidedicarboxylic acid, oxalic acid, malonic acid, succinic acid, glutaric acid, adipic acid, pimeric acid, suberic acid, azelaic acid, sebacic acid and diethylsuccinic acid.

Examples of the polyvinyl chloride resins are, besides homopolymer of vinyl chloride, copolymers of vinyl chloride with vinyl acetate, maleic acid derivatives, higher alkyl vinyl ethers and the like.

Examples of the polystyrene resins are, besides homopolymer of styrene, polystyrene graft-copolymerized with butadiene, polystyrene blended with styrene-butadiene rubber, styrene-maleic anhydride copolymer and the like.

The EVOH (B) used in the present invention includes any ethylene-vinyl acetate copolymer with its vinyl acetate component hydrolyzed but, those having poor compatibility with polyolefin have relatively low ethylene content and high degree of saponification (hydrolysis) of vinyl acetate component. Particularly, EVOH's having an ethylene content of 20 to 65 mol %, preferably 20 to 60 mol %, more preferably 20 to 50 mol % and a saponification degree of vinyl acetate content of at least 96%, more particularly at least 99% are especially important as the object of the present invention, since they give, when used while being blended with a thermoplastic resin, particularly with polyolefin, excellent containers.

The melt flow index (MI) (measured under conditions of 190° C. and 2160 g) of the EVOH (B) is preferably at least 0.1 g/10 min, more preferably at least 0.5 g/10 min, and preferably 100 g/10 min at most, more preferably 50 g/10 min at most, most preferably 30 g/10 min at most.

The EVOH (B) herein may be modified with not more than 5 mol % of a copolymerizable monomer. Examples of the modifying monomer include propylene, 1-butene, 1-hexene, 4-methyl-1-pentene, acrylic acid esters, methacrylic acid esters, maleic acid, fumaric acid, itaconic acid, vinyl esters of higher fatty acids, alkyl vinyl ethers, N-(2-dimethylaminoethyl)methacrylamide or quaternary compounds thereof, N-vinylimidazole or quaternary compounds thereof, N-vinylpyrrolidone, N,N-butoxymethylacrylamide, vinyltrimethoxysilane, vinylmethyldimethoxysilane, vinyldimethylmethoxysilane and the like.

The S-EVOH (C) is, in the present invention, a specific EVOH suitably selected and newly developed for the purpose of significantly improving compatibility between thermoplastic resins, particularly polyolefin (A) and EVOH (B), and is a saponified product of an ethylene-vinyl acetate copolymer having an ethylene content of 68 to 98 mol % and a saponification degree of vinyl acetate component of at least 20%. Those particularly effective in improving compatibility have ethylene content of at least 70 mol %, and 96 mol % at most, more preferably 94 mol % at most, and a saponification degree of vinyl acetate component of at least 30%, more preferably at least 40%. The upper limit of the saponification degree is not specifically restricted and a saponification degree of substantially 100% can also be used.

An EVOH having an ethylene content of less than 68 mol %, or a saponification degree of vinyl acetate component of less than 20% has poor compatibility with thermoplastic resin, especially polyolefin. An EVOH having an ethylene content exceeding 98 mol % generates, upon melt molding, flow instability to extremely impair the appearance of molded articles. The ethylene content of S-EVOH (C) is preferably at least 5 mol % higher, more preferably at least 10 mol % higher than that of EVOH (B).

The melt flow index (MI) of the EVOH (C) is preferably at least 0.1 g/10 min, more preferably at least 0.5 g/10 min, and preferably 100 g/10 min at most, more preferably 50 g/10 min at most, most preferably 30 g/10 min at most.

The S-EVOH (C) used in the present invention may be modified with an unsaturated carboxylic acid or derivatives thereof. The modifying acid monomer is $\alpha,\beta$-unsaturated carboxylic acid, or esters or anhydrides thereof, and examples of the foregoing includes acrylic acid, methacrylic acid, maleic acid, fumaric acid, itaconic acid, monomethyl or ethyl esters of maleic acid, fumaric acid, and the like, maleic anhydride, itaconic anhydride and the like. These acid monomers may be used singly or in combination.

The blending ratio by weight between a thermoplastic resin (A) and EVOH (B) is 60:40 to 99.9:0.1, preferably 65:35 to 99.7:0.3 for the purpose of producing higher effect of the present invention.

The amount of S-EVOH (C) added in the present invention depends on the type and composition of the EVOH and thermoplastic resin used and cannot definitely be specified, but the ratio of total weight of (thermoplastic resin (A) and EVOH (B) to the weight of S-EVOH is generally in the range of from 99.7:0.3 to 70:30, preferably from 99.7:0.3 to 80:20, more preferably from 99.7:0.3 to 90:10. If the addition is less than 0.3 part, the effect of improving compatibility will not be produced. While the upper limit is not necessarily specified, the addition of not more than 30 parts is sufficient for practical purposes.

Among the above-mentioned compositions, those comprising at least one thermoplastic resin (A) selected from the group consisting of polyamide resins, polyester resins, polyvinyl chloride resins and polystyrene resins, EVOH (B) and S-EVOH (C) and having the same composition ratio as above are novel and useful.

When a composition comprising a thermoplastic resin (A) and EVOH (B) is melt molded, the effect of the present invention will be still more marked if this composition is incorporated with pellets obtained by previously incorporating S-EVOH (C) into the thermoplastic resin (A) or EVOH (B), or into both, and blending and pelletizing the mixture.

In previously incorporating S-EVOH (C) into, for example, EVOH (B), 5 to 100 parts of EVOH (C) is added to 100 parts of EVOH (B). In this case of previously blending S-EVOH (C) with EVOH (B), even a small amount of the S-EVOH (C) will produce a large effect.

The composition of the present invention can be obtained by any blending process, which includes dry blending the three, a process comprising incorporating beforehand S-EVOH (C) into entire or part of thermoplastic resin (A) and/or EVOH (B), a process comprising dry blending granules of the three resins, a process comprising blend pelletizing the above composition, a process comprising dry blending or blend pelletizing S-EVOH (C) and, as required, thermoplastic resin (A) and EVOH (B) with granules (recovery) obtained by granulating multilayered sheets, cups, bottles or the like containing a thermoplastic resin layer or an EVOH (B) layer, and like processes.

The components are incorporated by using ribbon blender, high-speed mixer-cokneader, mixing roll, extruder, intensive mixer or the like, to give the compositions of the present invention.

The compositions comprising the above-described (A), (B) and (C) may further incorporate known additives used for thermoplastic resins (A) or EVOH (B). These additives include antioxidants, ultraviolet absorbers, plasticizers, static eliminators, slipping agents, colors, agents for improving thermal stability and other polymeric substances, and may be added within limits not to impair the effect and function of the present invention. Concrete examples of the additives are as follows.

Antioxidant: 2,5-di-t-butylhydroquinone, 2,6-di-t-butyl-p-cresol, 4,4'-thiobis-(6-t-butylphenol), 2,2'-methylene-bis-(4-methyl-6-t-butylphenol), octadecyl-3-(3',5'-di-t-butyl-4'-hydroxyphenyl) propyonate, 4,4'-thiobis-(6-t-butylphenol) and the like.

Ultraviolet absorber: ethylene-2-cyano-3,3'-diphenyl acrylate, 2-(2'-hydroxy-5'-methylphenyl)benzotriazole, 2-(2'-hydroxy-3'-t-butyl-5'-methylphenyl)5-chlorobenzotriazole, 2-hydroxy-4-methoxybenzophenone, 2,2'-dihydroxy-4-methoxybenzophenone, 2-hydroxy-4-octoxybenzophenone and the like.

Plasticizer: dimethyl phthalate, diethyl phthalate, dioctyl phthalate, wax, liquid paraffine, phosphoric acid esters and the like.

Static eliminator: pentaerythrit monostearate, sorbitan mono-palmitate, sulfated polyolefins modified with sulfuric acid, polyethylene oxide, carbowax, and the like.

Slipping Agent: ethylenebisstearoamid, butyl stearate and the like.

Color: carbon black, phthalocyanine, quinacrydone, indolin, azo pigments, red ocher and the like.

In the present invention, it is important to laminate an EVOH layer on a layer of the above-described composition comprising (A), (B) and (C). This lamination can provide multilayered structures that have neat appearance without wavy pattern and excellent gas barrier property, and further are, because of the composition (F) layer being uniform and having good compatibility, excellent in intra- and inter-layer adhesion and resistance to pin-hole formation and shock. The afore-described EVOH (B) is used for the EVOH layer.

Adhesive resins are generally used in conducting lamination. Where polyolefin is used as the thermoplastic resin, suitable adhesive resins are polyolefins modified with an unsaturated carboxylic acid or derivatives thereof.

These modified polyolefins include polyolefins modified with at least one member selected from the group consisting of unsaturated carboxylic acids, such as acrylic acid, methacrylic acid, maleic acid, fumaric acid, crotonic acid, itaconic acid and citraconic acid, and anhydrides of the foregoing, and derivatives of unsaturated carboxylic acids, such as methyl acrylate, methyl methacrylate, ethyl acrylate, propyl acrylate, butyl acrylate, butyl methacrylate, vinyl acetate, glycidyl acrylate, glycidyl methacrylate, acrylamide, methacrylamide, sodium acrylate and sodium methacrylate. Compositions comprising these polyolefins are also included herein. Suitable examples of the polyolefins to be modified are polyethylene, polypropylene, ethylene-vinyl acetate copolymer and ethylene-acrylate copolymer.

Where the thermoplastic resin (A) is a polyamide resin, while co-extrusion molding is possible without the use of an adhesive resin, the adhesive resins mentioned below can also be used. Where the thermoplastic resin (A) is a polyester resin or polycarbonate resin, most preferred adhesive resins to be used are thermoplastic polyester adhesive resins. As particularly preferred ones, mentions are made of modified polyesters composed of a dicarboxylic acid component and a glycol component and further comprising at least one element selected from the group consisting of Al, Cr, Sn Ge and Si, in an amount of 0.1 to 5 moles based on 100 moles of the dicarboxylic acid component. Among the above elements, preferred are Al and Cr because of their capability to exhibit high bond strength, of which Al is particularly preferred.

Examples of the dicarboxylic acid component for the polyester adhesive resins are aromatic dicarboxylic acid, such as terephthalic acid, isophthalic acid, orthophthalic acid, naphthalenedicarboxylic acid, diphenyletherdicarboxylic acid and diphenyl-4,4'-dicarboxylic acid; aliphatic dicarboxylic acid, such as oxalic acid, malonic acid, succinic acid, glutaric acid, adipic acid, pimelic acid, suberic acid, azelaic acid and sebacic acid; and alicyclic dicarboxylic acid, such as cyclohexanedicarboxylic acid. These components may be used singly or in combination. Examples of the glycol component are aliphatic glycols, such as ethylene glycol, 1,3-propanediol, 1,4-butanediol, 1,5-pentanediol, 1,6-hexanediol, 1,9-nonanediol, diethylene glycol and triethylene glycol; alicyclic diols such as cyclohexanediol and cyclohexanedimethanol; and the like. These components may be used singly or in combination.

Other adhesive resins used in the case where the resin (A) is a polyester resin or a polycarbonate resin are polyester-amide copolymers having an ester group/amide group molar ratio of 90/10 to 10/90, wherein the carboxylic acid component and glycol component are selected from the above-mentioned members.

Examples of the amine or amide component used for the above adhesive resins are diamines, such as piperadine, pentaethylenediamine, hexaethylenediamine, nonaethylenediamine, decaethylenediamine, undecaethylenediamine and nodecaethylenediamine; and lauryllactam, undecaneamide, hexamethylenesebacamide, hexamethyleneadipamide, ω-aminoheptanoic acid, ω-amononoaic acid and the like.

Where the thermoplastic resin (A) is polystyrene resins, polyvinyl chloride resins, acrylic resins, polyvinylidene chloride resin, polyurethane resins, polyester resins, and the like, the afore-described modified polyolefin resins can also suitably be used as the adhesive resin.

Suitable examples of the multilayered structures have the following layer constructions, where the resin composition of the present invention, thermoplastic resin, EVOH and adhesive resin are represented by F, A, B and AD, respectively.

2 layers: B/F
3 layers: A/F/B, F/B/F, F/AD/B
4 layers: F/B/AD/A, A/F/AD/B
5 layers: F/AD/B/AD/F, A/F/B/AD/A, A/F/B/F/A
6 layers: A/F/AD/B/AD/A
7 layers: A/F/AD/B/AD/F/A In these multilayered structures, the resin composition of the present invention can be replaced by scraps of the multilayered structure. Further scraps of other polyolefin molding can be incorporated.

The multilayered structures having the above layer construction are, since they comprise EVOH that has excellent gas barrier property, useful for packaging food, medical articles such as medicines and medical utensils, which require high gas barrier packaging.

For forming multilayered structures, generally speaking the best process is what is known as co-extrusion molding, which comprises using separate extruders in a number corresponding to the number of types of resin layers and simultaneously co-extruding the plurality of melts, laminated one upon another, of the resins melted in the extruders. Also available are extrusion coating, dry lamination and like processes. The multilayered structures thus obtained, such as parison, film and sheet, can further be stretched by monoaxial stretching, biaxial stretching, blow stretching or the like, or be thermoformed, to give containers (e.g. bottles and cups) having still distinctive characteristics in mechanical properties, gas barrier properties and the like.

The term "thermoforming" herein means a process which comprises softening by heating a sheet beforehand and then deforming the sheet with plug and by vacuum pressure with simultaneous cooling, to form cups. The heating can be conducted by any means as long as it makes the sheet thermally nearly uniform by keeping the sheet for a prescribed time at a temperature required for its deformation, but is preferably conducted by the use of a heater in view of operatability.

Other features of the invention will become apparent in the course of the following descriptions of exemplary embodiments which are given for illustration of the invention and are not intended to be limiting thereof. In the Examples, "parts" means "parts by weight".

EXAMPLES

Example 1

Pellets (F) were obtained by dry blending 95 parts of a polypropylene (A) (melt flow index determined according to ASTM-D1238, 230° C.: 0.5 g/10 min), 5 parts of an EVOH (B) (ethylene content: 33 mol %, saponification degree: 99.9% and melt flow index (190° C., 2160 g): 1.5 g/10 min and 2 parts of an S-EVOH (C) {ethylene content: 89 mol %, saponification degree: 91% and melt flow index (190° C., 2160 g): 5.1 g/10 min}, and melt extruding the blend through an extruder equipped with a full flight type screw having a diameter of 40 mm, an L/D of 24 and a compression ratio of 3.8. The blend (F) thus obtained and the above EVOH (B) and adhesive resin (E) (maleic anhydride-modified polypropylene) were fed to separate extruders to conduct 4-kind/7-layer co-extrusion molding to obtain a sheet having a layer construction of A/F/E/B/E/F/A (thickness ratio: 30/15/2.5/5/1.5/15/30). (A) was extruded through an extruder equipped with a single screw having a diameter of 65 mm and an L/D of 22 at 200° to 240° C., (B) through an extruder equipped with a single screw having a diameter of 40 mm and an L/D of 26 at 170° to 210° C., (F) through an extruder equipped with a single screw having a diameter of 40 mm and an L/D of 26 at 160° to 220° C., (E) through an extruder with a single screw having a diameter of 40 mm and an L/D of 22 at 160° to 210° C., and (B) through an extruder with a single screw having a diameter of 40 mm and an L/D of 26 at 170° to 210° C., and all the above melts were joined through a feed block type die having a width of 600 mm at 240° C. into the multilayered sheet having a thickness of 1000 μ. After 24 hours' continuous operation, the sheet properties were still good, showing no turbulence (wavy pattern) or phase-separated irregular matters caused by poor compatibility, and no abnormal flow or delamination.

The sheet was formed by known thermoforming into cups. The cups formed showed, similar to the case of the above sheet, no phase-separated irregular matters caused by poor compatibility and had no turbulence (wavy pattern) or delamination caused by abnormal molding.

COMPARATIVE EXAMPLE 1

Pellets (F) were obtained by dry blending 95 parts of a polypropylene (A) (melt flow index determined according to ASTM-D1238, 230° C.: 0.5 g/10 min) and 5 parts of an EVOB (B) {ethylene content: 33 mol %, saponification degree: 99.9% and melt flow index (190° C., 2160 g): 1.5 g/10 min, and melt extruding the blend through an extruder equipped with a full flight type screw having a diameter of 40 mm, an L/D of 24 and a compression ratio of 3.8.

Example 1 was repeated except for using the pellets thus obtained instead of the blend (F) to obtain a sheet having a thickness of 1,000 μ. Immediately after the start of the molding operation, the sheet showed turbulence (wavy pattern) and many nonuniform phase-separated irregular matters, which had not been seen in Example 1. The number of the irregular matters increased with time and the obtained sheet had extremely bad appearance.

The sheet was further formed into cups in the same manner as in Example 1. The cups formed showed still more irregular matters and more distinct wavy pattern than the sheet, and were partly delaminated, the appearance being extremely poor.

EXAMPLES 2 through 5

Blends were obtained by blend pelletizing the polypropylene (A) and EVOH (B) used in Example 1 and various S-EVOH (C)'s as shown in Table 1 in ratios as shown, and the blends thus obtained were extrusion molded into sheets in the same manner as in Example 1. The sheets thus obtained were evaluated for the surface appearance and the results are shown in Table 1.

The evaluation results of the sheet surfaces are shown in terms of the following levels.

Excellent: exhibited uniform and high compatibility, showed no turbulence (wavy pattern) or phase-separated irregular matters.

Good: exhibited uniform and high compatibility, showed no turbulence (wavy pattern) but generated a few small phase-separated irregular matters upon long-period molding operation.

Fairly good: showed a good compatibility, but generated partly a few phase-separated irregular matters.

Poor: showed an improved compatibility, but generated a few phase-separated irregular matters.

TABLE 1

| Example | PP*(A) (parts) | EVOH(B) (parts) | S—EVOH(D) Ethylene content (mol %) | S—EVOH(D) Saponification degree of vinyl acetate component (%) | (parts) | Appearance of sheet surface |
| --- | --- | --- | --- | --- | --- | --- |
| 1 | 95 | 5 | 89 | 91 | 2 | excellent |

TABLE 1-continued

| Example | PP*(A) (parts) | EVOH(B) (parts) | S—EVOH(D) Ethylene content (mol %) | S—EVOH(D) Saponification degree of vinyl acetate component (%) | S—EVOH(D) (parts) | Appearance of sheet surface |
|---|---|---|---|---|---|---|
| 2 | 95 | 5 | 70 | 94 | 2 | good |
| 3 | 95 | 5 | 89 | 43 | 4 | good |
| 4 | 64 | 36 | 93 | 23 | 18 | fairly good |
| 5 | 69 | 31 | 74 | 82 | 2 | good |

*PP: polypropylene

COMPARATIVE EXAMPLE 2

The sheet obtained in Comparative Example 1 was granulated, and Example 1 was repeated except for using the the granules thus obtained instead of (F), to obtain a sheet having a thickness of 1,000 μ. About 30 minutes after the start of the molding operation, there were observed on the sheet many nonuniform phase-separated irregular matters, which had not been seen Example 1. The number of the irregular matters increased with time and the sheet had turbulence (wavy pattern) and extremely bad appearance.

EXAMPLE 7

Blend pellets (F) were obtained by blending a low density polyethylene (A) (melt flow index according to ASTM-D1238: 2.1 g/10 min, density according to ASTM-D1505: 0.92 g/cm³), an EVOH (B) having an ethylene content of 32.5 mol %, a saponification degree of 99.9% and a melt flow index of 1.4 g/10 min, and an S-EVOH (C) having an ethylene content of 74 mol %, a saponification degree of vinyl acetate component of 82% and a melt flow index of 4.9 g/10 min in a ratio of A:B:C of 63:10:4. Co-extrusion was conducted by extruding this blend (F) through an extruder equipped with a screw having a diameter of 40 mm and an L/D of 23, the low density polyethylene (A) through an extruder with a screw having a diameter of 45 mm and an L/D of 22, the EVOH (B) through an extruder with a screw having a diameter of 35 mm and an L/D of 23 and an adhesive resin (E) of a maleic anhydride-modified polyethylene (ADMER LF-500, made by Mitsui Petrochemical Industries, Ltd.), and joining these four melts through a 4-kind/5-layer die at 240° C., followed by known blow molding, to obtain bottles, whose cross section is elliptical, having an average wall thickness of about 600 μ and a capacity of about 280 cc and having a layer construction of (inside) A/E/B/E/F (outside) (thickness ratio: 12/1/2/1/12). Then, after 48 hours' continuous operation, there were still obtained bottles of uniform and neat appearance, the F layer of which did not show any phase-separated irregular matter caused by poor compatibility.

EXAMPLE 11

Pellets (G) were obtained by dry blending 100 parts of an EVOH having an ethylene content of 33 mol %, a saponification degree of vinyl acetate component of 99.9% and a melt flow index (190° C., 2160 g) of 1.4 g/10 min and 30 parts of an S-EVOH having an ethylene content of 89 mol %, a saponification degree of vinyl acetate component of 91% and a melt flow index (190° C., 2160 g) of 5.1 g/10 min, followed by melt extruding the obtained blend through an extruder equipped with a full flight type screw having a diameter of 40 mm, an L/D of 24 and a compression ratio of 3.8.

Example 1 was repeated except for using 5 parts of the blend pellets (G) instead of 5 parts of EVOH (B) used in producing the pellets (F) in Example 1 and using no additional S-EVOH (C), to obtain a sheet having a thickness of 1,000 μ. After 24 hours' continuous molding operation, there was still obtained a good sheet, which did not show any turbulence (wavy pattern) or phase-separated irregular matter and showed no flow instability or delamination.

EXAMPLE 12

Pellets (F) were obtained by dry blending 95 parts of a shock-resistant polystyrene resin (A) (melt flow index determined according to ASRM-D1238: 2.2 g/10 min), 5 parts of an EVOH (B) {ethylene content: 33 mol %, saponification degree: 99.9% and melt index (190° C., 2160 g): 1.5 g/10 min} and 2 parts of an S-EVOH (C) {ethylene content: 89 mol %, saponification degree: 91% and melt flow index (190° C., 2160 g): 5.1 g/10 min}, and melt extruding the obtained blend through an extruder equipped with a full flight type screw having a diameter of 40 mm, an L/D of 24 and a compression ratio of 3.8. The obtained blend pellets (F), the above-mentioned shock-resistant polystyrene resin (A), the above-mentioned EVOH (B) and an adhesive resin (E) (ethylene-vinyl acetate copolymer modified with maleic anhydride) were fed to separate extruders, and 4-kind/7-layer co-extrusion molding was conducted to obtain a sheet having a construction of A/F/E/B-/E/F/A (thickness ratio: 30/15/2.5/5/2.5/15/30). (A) is extruded through an extruder equipped with a single screw having a diameter of 65 mm and an L/D of 22 at 200° to 240° C., F through an extruder with a single screw having a diameter of 40 mm and L/D of 26, (B) through an extruder with a single screw having a diameter of 40 mm and an L/D of 26 at 170° to 210° C., and (E) through an extruder with a single screw having a diameter of 40 mm and an L/D of 22 at 160° to 210° C., and all the four extruded melts were joined through a feed block type die having a width of 600 mm at 240° C. into a sheet having a thickness of 1,000 μ. After 24 hours' continuous molding operation, there was still obtained a good sheet, which did not show any phase-separated irregular matter caused by poor compatibility, turbulence (wavy pattern), flow instability or delamination.

The sheet was formed by known thermoforming into cups. The cups formed showed no phase-separated irregular matters caused by poor compatibility and had not turbulence (wavy pattern) or delamination caused by abnormal molding.

COMPARATIVE EXAMPLE 4

Pellets (F) were obtained by dry blending 95 parts of a shock-resistant polystyrene resin (A) (melt flow index determined according to ASRM-D1238: 2.2 g/10 min)

and 5 parts of an EVOH (B) {ethylene content: 33 mol %, saponification degree: 99.9% and melt flow index 190° C., 2160 g): 1.5 g/10 min}, and melt extruding the obtained blend through an extruder equipped with a full-flight type screw having a diameter of 40 mm, an L/D of 24 and a compression ratio of 3.8.

Example 12 was repeated except for using the pellets (F) thus obtained instead of the pellets (F) used in Example 12, to obtain a sheet having a thickness of 1,000 μ. Immediately after the start of the operation, the sheet showed wavy pattern and many nonuniform phase-separated irregular matters, which had not been seen in Example 12. The number of the irregular matters increased with time, and the sheet obtained had extremely bad appearance.

The sheet obtained was further formed into cups in the same manner as in Example 12. The cups obtained showed still more phase-separated irregular matters and more distinct wavy pattern than the sheet and thus had extremely bad appearance, delamination also partly being seen.

EXAMPLES 13 through 16

Pellets were obtained by blend pelletizing the shock resistant polystyrene resin (A) and EVOH (B) used in Example 12 and various S-EVOH (C)'s as shown in Table 2 in ratios as shown. Example 12 was repeated except for using these pellets instead of (F), to conduct melt molding of sheets. The evaluation results of the appearance of the sheets thus obtained are also shown in Table 2.

an L/D of 23, the polyethylene terephthalate (A) through an extruder with a screw having a diameter of 45 mm and an L/D of 22, the EVOH (B) through an extruder with a screw having a diameter of 35 mm and an L/D of 23 and an adhesive resin (E) of a piperadine/1,4-cyclohexanedimethanol/azelaic acid copolymer (molar ratio: 41/9/50), and joining these four melts through a 4-kind/5-layer die at 240° C., followed by known blow molding, to obtain bottles, whose cross section is elliptical, having an average wall thickness of about 600 μ and a capacity of about 280 cc and having a layer construction of (inside) A/E/B/E/F (outside) (thickness ratio: 12/1/2/1/12). Then, after 48 hours' continuous operation, there were still obtained bottles of uniform and neat appearance, the F layer of which did not show any turbulence (wavy pattern) or phase-separated irregular matter caused by poor compatibility.

EXAMPLE 19

The bottles obtained in Example 18 were granulated and to 100 parts of the obtained granules 2 pats of S-EVOH (C) was dry blended. Example 18 was repeated except for using this granule-S-EVOH blend instead of F, to conduct co-extrusion, followed by known blow molding, to obtain bottles of elliptical cross section. After 24 hours' continuous operation, there were still obtained good bottles, the granule-S-EVOH blend layer of which did not show any phase-separated irregular matter caused by poor compatibility, flow instability or poor appearance.

TABLE 2

| Example | Shock-resistant polystyrene(A) (parts) | EVOH(B) (parts) | S—EVOH(D) Ethylene content (mol %) | S—EVOH(D) Saponification degree of vinyl acetate component (%) | S—EVOH(D) (parts) | Appearance of sheet surface |
| --- | --- | --- | --- | --- | --- | --- |
| 12 | 95 | 5 | 89 | 91 | 2 | excellent |
| 13 | 95 | 5 | 70 | 94 | 2 | good |
| 14 | 95 | 5 | 89 | 43 | 4 | good |
| 15 | 64 | 36 | 93 | 23 | 18 | fairly good |
| 16 | 69 | 31 | 74 | 82 | 2 | good |

COMPARATIVE EXAMPLE 5

The sheet obtained in Comparative Example 4 was granulated, and Example 12 was repeated except for using the the granules thus obtained instead of (F), to obtain a sheet having a thickness of 1,000 μ. About 30 minutes after the start of the molding operation, there were observed on the sheet many nonuniform phase-separated irregular matters, which had not been seen in Example 12. The number of the irregular matters increased with time and the sheet had extremely bad appearance.

EXAMPLE 18

Blend pellets (F) were obtained by blending a polyethylene terephthalate (A) {melt flow index according to ASTM-D1238, (210° C.): 2.6 g/10 min, density according to ASTM-D1505: 1.4 g/cm³}, an EVOH (B) having an ethylene content of 32.5 mol %, a saponification degree of 99.9% and a melt flow index of 1.4 g/10 min, and an S-EVOH (C) having an ethylene content of 74 mol %, a saponification degree of vinyl acetate component of 82% and a melt flow index of 4.9 g/10 min in a ratio of A:B:C of 63:10:4. Co-extrusion was conducted by extruding this blend (F) through an extruder equipped with a screw having a diameter of 40 mm and

COMPARATIVE EXAMPLE 6

Example 19 was repeated except that S-EVOH (C) was not used, to mold bottles of elliptical cross section and having a construction of 4 kinds/5 layers. Immediately after the start of the operation many nonuniform phase-separated irregular matters generated. The number of the irregular matters increased with time and the bottles obtained had extremely bad appearance.

EXAMPLE 22

Blend pellets (F) were obtained by blending a nylon-6/12 (A) (ratio by weight of caprolactam component and lauryllactam component: 80/20, melting point: 196° C. and relative viscosity: 2.5), an EVOH (B) (ethylene content: 32.5 mol %, saponification degree of vinyl acetate component: 99.8% and melt flow index: 1.4 g/10 min) and S-EVOH (C) {ethylene content: 89 mol %, saponification degree of vinyl acetate component: 91% and melt flow index (190° C., 2160 g): 5.1 g/10 min} in a ratio of A:B:C of 77:20:3, and melt extruding the obtained blend through an extruder. Co-extrusion molding was conducted by feeding the thus obtained blend (F) and nylon-6(G) to separate extruders, to obtain a 2-kind/3-layer multilayered film having a construction of G/F/G (thickness: 10/15/10 $\mu$). After 24 hours' continuous molding operation, there was still obtained a good film, which did not show any turbulence (wavy pattern) or phase-separated irregular matter caused by poor compatibility.

COMPARATIVE EXAMPLE 7

Example 22 was repeated except that the S-EVOH was not used, to obtain a 2-kind/3-layer multilayered film. The obtained film showed flowing patterns and phase-separated irregular matters, which were not seen in Example 22.

EXAMPLE 23

Blend pellets (F) were obtained by blending a low density polyethylene (A) {melt flow index according to ASTM-D 1238: 2.1 g/10 min, density according to ASTM-D1501: 0.92 g/cm$^3$}, an EVOH (B) having an ethylene content of 32.5 mol %, a saponification degree of vinyl acetate component of 99.9% and a melt flow index of 1.4 g/10 min, and an S-EVOH (C) having an ethylene content of 74 mol %, a saponification degree of vinyl acetate component of 82% and a melt flow index of 4.9 g/10 min in a ratio of A:B:C of 85:10:5. Co-extrusion was conducted by extruding this blend (F) through an extruder equipped with a screw having a diameter of 40 mm and an L/D of 23, the low density polyethylene (A) through an extruder with a screw having a diameter of 45 mm and an L/D of 22, and the EVOH (B) through an extruder with a screw having a diameter of 35 mm and an L/D of 23, and joining these three melts through a 3-kind/3-layer die at 240° C., followed by known blow molding, to obtain bottles, whose cross section is elliptical, having an average wall thickness of about 600 $\mu$ and a capacity of about 280 cc and having a layer construction of (inside) B/F/A (outside) (thickness ratio; 2/10/12). Then, after 48 hours' continuous operation, there were still obtained bottles of uniform and neat appearance, the F layer of which did not show any turbulence (wavy pattern) or phase-separated irregular matter caused by poor compatibility. One of the bottles thus obtained was filled with raw orange juice, and the bottle with the contents was stored at 5° C. for 10 days. When the orange juice after the storage was drunk, it tasted nearly same as before storage, which indicated high gas barrier property of the bottle. The bottle was tested for oxygen permeability with OX-TRAN 10-50A made by Modern Control Co. at 20° C., 65% RH, which was found to be 20 cc·20 $\mu$/m$^2$·day·atm, showing its high oxygen gas barrier property.

COMPARATIVE EXAMPLE 8

Example 23 was repeated except for using, in molding bottles, a layer of the low density polyethylene (A) instead of the EVOH (B) layer as the inner layer, to mold 3-kind/3-layer bottles having an elliptical cross section. One of the bottles thus obtained was filled with raw orange juice, and the bottle with the contents was kept at 5° C. for 10 days. When the orange juice after the storage was drunk, it tasted bad, flavor being polyethylene-like, without the orange flavor, which indicated insufficient flavor barrier property of the bottle. The bottle was tested for oxygen permeability, which was found to be 2000 cc·20 $\mu$/m$^2$·day·atm, showing its poor oxygen gas barrier property.

Obviously, numerous modifications and variations of the present invention are possible in light of the above teachings. It is therefore to be understood that within the scope of the appended claims, the invention may be practiced otherwise than as specifically described herein.

We claim:

1. A multilayered structure comprising at least 2F-layers wherein each of said F-layers comprises a resin composition comprising:
   (A) a thermoplastic resin,
   (B) a saponified product of an ethylene-vinyl acetate copolymer having an ethylene content of 20 to 65 mol % and a saponification degree of vinyl acetate component of at least 96%, and
   (C) a saponified product of an ethylene-vinyl acetate copolymer having an ethylene content of 68 to 98 mol % and a saponification degree of vinyl acetate component of at least 20%, and a barrier layer which comprises a saponified product of an ethylene-vinyl acetate copolymer having an ethylene content of 20 to 65 mol % and a saponification degree of vinyl acetate component of at least 96% wherein said barrier layer is sandwiched between the F-layers.

2. A multilayered structure according to claim 1, wherein said thermoplastic resin (A) is a polyolefin.

3. A multilayered structure according to claim 2, wherein said polyolefin (A) is a polypropylene resin.

4. A multilayered structure according to claim 2, wherein said polyolefin (A) is a polyethylene resin.

5. A multilayered structure according to claim 1, wherein said thermoplastic resin (A) is a polyamide resin.

6. A multilayered structure according to claim 1, wherein said thermoplastic resin (A) is a polyester resin.

7. A multilayered structure according to claim 1, wherein said thermoplastic resin (A) is a polystyrene resin.

8. A multilayered structure according to claim 1, wherein said thermoplastic resin (A) is a polyvinyl chloride resin.

9. A multilayered structure according to claim 1, wherein said components (A), (B), and (C) are incorporated in a ratio by weight of (A):(B) of 60:40 to 99.9:0.1 and that of ((A)+(B)):(C) of 99.7:0.3 to 70:30.

* * * * *